(12) United States Patent
Ikegami et al.

(10) Patent No.: US 6,884,444 B1
(45) Date of Patent: Apr. 26, 2005

(54) DRINKS WITH THE USE OF SEAWATER AND PROCESS FOR PRODUCING THE SAME

(75) Inventors: Yoshinari Ikegami, Ako (JP); Hiroshi Tabuchi, Ako (JP); Koji Nakagawa, Ako (JP)

(73) Assignee: Ako Kasei Co., Ltd., Hyogo (JP)

( * ) Notice: Subject to any disclaimer, the term of this patent is extended or adjusted under 35 U.S.C. 154(b) by 0 days.

(21) Appl. No.: 09/913,799

(22) PCT Filed: Dec. 17, 1999

(86) PCT No.: PCT/JP99/07095

§ 371 (c)(1),
(2), (4) Date: Dec. 31, 2001

(87) PCT Pub. No.: WO00/47064

PCT Pub. Date: Aug. 17, 2000

(30) Foreign Application Priority Data

Feb. 15, 1999 (JP) .......................................... 11-035145

(51) Int. Cl.$^7$ ................................................ A23L 2/70
(52) U.S. Cl. ........................... 426/66; 426/590; 426/74
(58) Field of Search ............................ 426/66, 590, 74

(56) References Cited

U.S. PATENT DOCUMENTS

| | | | |
|---|---|---|---|
| 4,189,379 A | * | 2/1980 | Finley ......................... 210/644 |
| 4,634,533 A | * | 1/1987 | Somerville et al. ......... 210/722 |
| 4,781,837 A | * | 11/1988 | Lefebvre ..................... 210/640 |
| 5,454,916 A | * | 10/1995 | Iwata ......................... 210/744 |
| 6,171,622 B1 | * | 1/2001 | Someya et al. ............... 426/74 |
| 6,190,556 B1 | * | 2/2001 | Uhlinger ..................... 210/636 |
| 6,261,610 B1 | * | 7/2001 | Sher et al. ................... 426/74 |
| 6,461,650 B1 | * | 10/2002 | Remesy ....................... 426/74 |

FOREIGN PATENT DOCUMENTS

| | | | |
|---|---|---|---|
| EP | 0 391 318 A1 | | 10/1990 |
| JP | 60-255729 | | 12/1985 |
| JP | 404126057 A | * | 4/1992 |
| JP | 8209739 | | 8/1994 |
| JP | 9290260 | | 11/1997 |
| JP | 10-150960 | | 6/1998 |
| JP | 10-314550 | | 12/1998 |
| WO | WO 96/29890 | * | 10/1996 |
| WO | WO 99/40801 | * | 8/1999 |

OTHER PUBLICATIONS

Bank E., "Use of minerals in non–alcoholic beverages," J Journal, vol. 33, No. 12, 1983, pp. 427–428.

Mitsubishi Heavy Ind Co Ltd. "Mfg. Of carbonated drinking water–from water obtd. by desalination of sea water," Jun. 2, 1987.

Shikina M. I. et al., "Artificial mineralization of desalinized potable water using tablets and powders," Kosmicheskaya Biologiya I Aviakosmicheskaya Meditsina, , vol. 23, No. 4, 1989, pp. 74–76.

Al Fraij K M, et al., "Comparative study of potable and mineral waters available in the State of Kuwait," Desalination, vol. 123, No. 2–3, Oct. 10, 1999, pp. 253–264.

* cited by examiner

*Primary Examiner*—N. Bhat
(74) *Attorney, Agent, or Firm*—Knobbe, Martens Olson & Bear LLP

(57) ABSTRACT

A process for producing a drink by desalting seawater to separate it into water and a concentrate sufficiently containing essential minerals such as magnesium, calcium and iron and vitamins, etc., and adding to the water either one of the concentrate itself or essential mineral components such as water-soluble magnesium, calcium, iron, etc. separately obtained from a seawater concentrate; and health-promoting drinks obtained by the method.

14 Claims, No Drawings

DRINKS WITH THE USE OF SEAWATER AND PROCESS FOR PRODUCING THE SAME

This application is the U.S. National Phase under 35 U.S.C. §371 of International Application PCT/JP99/07095, filed Dec. 17, 1999, which claims priority based on JP11-35145, filed Feb. 15, 1999.

TECHNICAL FIELD

The present invention relates to a drink that can effectively supplement minerals and a method for producing the same.

BACKGROUND ART

In a diversified contemporary society, consumers' need for foods and drinks has resulted in a great variety of selections. With trends towards health consciousness and orientation to taste as a background, various ideas and improvements have been implemented and a great number of new products for consumers are on the market.

As to drinks, carbonated drinks, coffee drinks, and juices have been widely used for a long time. Saccharide and caffeine, which are main ingredients of those drinks, however, are considered to have rather a harmful effect on health. Consumers are shying away from those drinks. Instead, healthy green tea and sports drinks are gaining in popularity these days. It is expected that trends towards taste orientation and health consciousness will continue to be strong and will be of greater importance in the future. Demand for healthy drinks satisfying consumers' taste orientation and health consciousness is expected to grow in the drink trade.

Of healthy drinks, drinks containing essential minerals such as magnesium, calcium, iron and vitamins, which the Japanese are said not to take sufficiently, are starting to attract consumers' attention for their excellent effects on health.

Conventionally, a typical mineral-fortified drink is called mineral water. Mineral water is produced by adding mineral components obtained from ore to drinking water such as tap water. There are many cases regarding mineral water laid open in the patent journal including Japanese Patent Laid-open No. 1997-164390 and Japanese Patent Laid-open No. 1997-187777.

These drinks, however, are produced by only adding mineral components. Of the minerals essential for the human body, only one or a few types of target components are included. Although essential mineral components such as magnesium and calcium are added, other essential minor mineral components such as iodine and copper are not included. Some products are produced as drinks by adjusting the taste by adding sugar and sour flavors. In either case, no drinks satisfying as healthy drinks with well-balanced mineral components have been obtained.

To solve the problem that conventional mineral water does not contain sufficient essential mineral components and essential minor mineral components, methods for using seawater as an epoch-making and new mineral source were proposed. Techniques laid open until now include: Japanese Patent Laid-open No. 1985-255729 relating to a mineral supplement produced by desalting seawater to reduce the content of NaCl in seawater and sterilizing it; Japanese Patent Laid-open No. 1991-77689 relating to ionic water for producing foods and drinks produced by dissolving in water (1) a precipitate generated by condensing a solution obtained by acidifying seawater, adding an alkali-fortified supplement and removing a precipitate generated, and further cooling the solution, and (2) a solid obtained by removing moisture content from the solution obtained after removing the precipitate; Japanese Patent Laid-open No. 1993-219921 relating to a drink in which sea water obtained from the deep sea is mixed with tap water; and Japanese Patent Laid-open No. 1991-77689 relating to a device for desalting seawater using a reverse osmosis method and adding mineral components by putting the seawater in contact with ore.

Most of these techniques, however, are not suitable for drinks. Those adding seawater cannot avoid the salty taste. If reducing an amount of seawater to be added to suppress the salty taste, only a very small amount of essential minor mineral components is included. In either case, no so-called "delicious" drink has been realized taking advantage of mineral components contained in seawater. There are products using the water of the Dead Sea or Great Salt Lake as a seasoning or an additive for refreshing drinks. The composition of these products is not uniform in all cases because they are natural products. Additionally, it is necessary to dilute the products when used, and adjusting their original taste is difficult. As a result, only a limited number of consumers accept those products.

After having examined the use of seawater for drinks in various manners, the inventors of the present invention have accomplished this invention relating to adding mineral components to water obtained by desalting seawater. This invention has already been applied as Japanese Patent Laid-open No. 1998-51308, Japanese Patent Laid-open No. 1999-32760 and Japanese Patent Laid-open No. 1999-34162, the present invention further improves the previous inventions.

DISCLOSURE OF INVENTION

Based on the problems found in conventional techniques, problems which the present invention intends to solve are: to improve mineral drinks which are important as future drinks to meet the needs of health consciousness and taste orientation, to aim to develop a mineral drink containing well-balanced minerals, and to produce a new mineral drink using seawater as a mineral source.

Having earnestly examined the problems to be solved so as to improve the above-mentioned conventional drinks and to aim to develop a mineral drink containing well-balanced minerals, the inventors of the present invention made it possible to produce a new mineral drink using seawater as a mineral source.

The ocean is the origin of all living creatures on earth and a treasure trove of all mineral elements and mineral resources. It accounts for most water resources on earth. Because of its salt content, using seawater for drinking water has been avoided. Exceptionally, seawater is used as drinking water merely in dry regions with extremely low rainfall by treating it to produce fresh water at a high cost. Mineral components in seawater have never been used before except for extracting salt from seawater.

The present invention relates to a new drink effectively using mineral components of seawater, which have never been used before. Using water produced by desalting seawater as a raw ingredient, a drink is produced by adding water-soluble mineral components to it.

As seawater used by the present invention, surface water and deep water can be used. Seawater obtained from any depth or in any sea area can be used, but it should be clean seawater without floating objects and toxic substances.

Desalination processing according to the present invention removes sodium chloride contained in large quantities in seawater. Various regular methods are used for this purpose, for which a reverse osmosis membrane method and a distillation concentration method are desirable. By desalinization, water and concentrate are separated. The water obtained is used as a raw ingredient for a drink. By removing sodium chloride from the concentrate obtained using a heating concentration method, etc., a mineral concentrate rich with mineral components such as magnesium and calcium, which are essential for human beings to live, is obtained. By processing this mineral concentrate, overwintered bittern bittern gypsum, etc. can be obtained. These can also be used as an additive.

As seawater used for the present invention, surface water can also be used. Deep water obtained at the depth of 100 to 10,000 m, preferably at the depth of 100 to 1000 m, particularly preferably at the depth of 200 to 500 m, however, is suitable.

In other words, the present invention is characterized in that a drink is produced by adding water-soluble mineral components to the water obtained by desalting seawater. The basic makeup of the invention comprises (1) to (15) in the following:

(1) A drink produced by adding water-soluble mineral components to water obtained by desalting seawater.

(2) The drink described in (1) above, wherein the water-soluble mineral components are obtained from seawater.

(3) The drink described in (1) or (2) above, wherein the water-soluble mineral components obtained from seawater are added to water obtained by desalting the same seawater.

(4) The drink described in (1) to (3) above, wherein the mineral components obtained from seawater are magnesium and calcium.

(5) The drink described in (1) to (4) above, wherein a weight ratio of magnesium to calcium is adjusted to 'four to one' to 'one to three'.

(6) The drink described in (1) to (5) above, wherein a weight ratio of magnesium to calcium is adjusted to 'three to one'.

(7) The drink described in (1) to (6) above, wherein hardness measured by the EDTA method is from 100 to 3,000.

(8) The drink described in (1) to (7) above, wherein hardness measured by the EDTA method is from 250 or 1,000.

(9) The drink described in (1) to (8) above, wherein taste has been adjusted using sugar or sour flavors.

(10) The drink described in any one of (1) to (9) above, wherein seawater used is surface water.

(11) The drink described in any one of (1) to (9) above, wherein seawater used is deep water.

(12) The drink described in (11) above, which is characterized in that seawater used is deep water obtained at a depth greater than 100 m.

(13) The drink described in (11) or (12) above, which is characterized in that seawater used is deep water obtained at a depth of 200 to 500 m.

(14) A method for producing a drink by separating seawater obtained into water and concentrate, and then adding either of the concentrate or water-soluble mineral components obtained from a separate concentrate to the water obtained by the separation.

(15) A method for producing the drink described in (14) above, which is characterized in that seawater obtained is deep water obtained at a depth greater than 100 m.

BEST MODE FOR CARRYING OUT THE INVENTION

The present invention relates to an unconventional new drink and a method for producing the same. It realizes a mineral drink containing well-balanced minerals, which can sufficiently supplement a daily intake of minerals essential for health as well as essential minor minerals. It also realizes a method for producing a new mineral drink using seawater as a rich source of minerals.

In the present invention, a drink can be obtained by adding and mixing water-soluble mineral components to raw ingredient water obtained by desalting seawater. Water-soluble mineral components can be obtained from ore, but those mentioned above, which are obtained by concentration of seawater, are preferable. Water-soluble mineral components used in the present invention signifies important minerals such as magnesium, calcium and iron excluding sodium chloride, and essential minor mineral components such as iodine, copper and zinc.

Furthermore in detail, in the present invention, a drink is obtained by dissolving the above-mentioned concentrate of seawater from which sodium chloride has been removed, overwintered bittern, or bittern gypsum, for example, in raw material water obtained by desalting seawater. During this process, essential minor mineral components such as iodine, copper and zinc, which are contained in seawater, incidentally dissolve in the drink.

Magnesium and calcium are the most important minerals for the human body. Until now, almost no healthy drinks, in which magnesium is mixed, however, have been available. Calcium is also essential in large quantities for forming and maintaining bones and teeth. The present invention is to add these two minerals as main ingredients. A mixing ratio of these two minerals can be optional. It is, however, preferable to adjust a magnesium-to-calcium (Mg to Ca) weight ratio to 'four to one' to 'one to three'. This is because if a magnesium-to-calcium weight ratio becomes higher than four, the drink becomes difficult to drink due to bitterness. If a calcium-to-magnesium weight ratio becomes larger than three, the taste becomes metallic or hard.

As compared to a recommended daily calcium intake of 600 mg, the current average daily intake by the Japanese is reported to be 570 mg. As compared to a recommended daily magnesium intake of 300 mg, the reported current average daily intake of calcium by the Japanese is 200 mg (Source: the Ministry of Welfare). To supplement the shortfall, It is most preferable to adjust a magnesium-to-calcium weight ratio to 'three to one' from standpoints of supplementing calcium and magnesium and satisfying the sense of taste.

For drinks, hardness of water is also important and it affects the taste and easiness to drink.

The drink hardness of the present invention is an index for indicating the content of magnesium ions and calcium ions in water and it is expressed by converting it into a calcium carbonate value.

In the present invention, the EDTA method was used to measure the hardness.

Hardness of 100 to 3,000 is preferable for a drink according to the present invention. If the hardness is below 100, the content of important minerals such as magnesium and calcium and essential minor minerals becomes very low. If it is above 3,000, the taste of a drink becomes hard and it becomes difficult to drink. To make the drink easy to drink and to increase an intake of important minerals such as magnesium and calcium, drink hardness of 500 to 1,500 is preferable.

From a standpoint of a drink mainly taken for supplementing minerals, hardness of 1,000 is taste-wise most preferable. Additionally, if used for general cooking such as cooking rice, hardness of 250 is preferable because it can be used for most cooking.

To improve the taste and drinkability of a drink, in the present invention, the taste can of course be adjusted using sugar and sour flavors. By this adjustment, delicate flavors such as a sweet flavor and a salty flavor are added.

Furthermore, the present invention has a new characteristic in a method for producing the above-mentioned drink. A fundamental of the production method is, as mentioned above, to desalt seawater to separate it into water and concentrate, and to add the concentrate obtained or water-soluble mineral components obtained from the concentrate to the water obtained.

Because mineral components such as magnesium and calcium, which are added to the water separated from seawater, are a seawater concentrate, minor elements included in seawater can be added sufficiently to a drink obtained according to the present invention. Both water and concentrate obtained from seawater contain essential minor minerals, minor elements and various substances in very small quantities. These components are considered to add delicate flavors and give marvelous effects on health.

Because sodium chloride is mostly removed, drinks do not taste salty and do not have a bad effect by sodium chloride on health. Because moderate seasoning is possible, a drink with characteristics including easy drinkability, improving health and refreshing, which sufficiently satisfy consumers, can be obtained. Furthermore, fruit juices, vitamins, etc. can be added if necessary. The drink can fulfill its function as a nutritious drink enriched with nutritious ingredients. By adding ingredients with medical effects, it further can fulfill its excellent function for improving health. Additionally, by specially adding sodium and potassium obtained from seawater, it can be produced as a drink for quenching thirst from perspiration after workouts or sports.

Modes for carrying out the present invention are specifically described below based on embodiments. The present invention, however, is not limited to these embodiments described below.

[Embodiment 1]

Processing of Seawater:

Seawater was separated into water and concentrate using a reverse osmosis membrane method. Using a compact tester manufactured by Toray Industries as a reverse osmosis membrane separator, seawater was separated under the following operation conditions:

Operating condition: Liquid temperature at 15° C. (59° F.)
Pressure: 56 MPa
Flow on the water side: 1.9 L/min.
Flow on the concentrated water side: 16 L/min.
Transmissibility of water separated by the above-mentioned operation was as follows:

TABLE 1

|  | Seawater | Water |
|---|---|---|
| Transmissibility (μS/cm) | 35,000 | 131 |

By adding overwintered bittern to bittern adjusted by an electrodialysis device, bittern gypsum was obtained. The bittern gypsum content and the minor constituents content were as shown in Table 2 below.

TABLE 2

|  | Calcium salt |
|---|---|
| Ca (%) | 24.2 |
| Fe (ppm) | 5.48 |
| Cu (ppm) | 0.66 |
| Mn (ppm) | 0.37 |

To measure the magnesium salt content, a magnesium salt solution was obtained by desalination by heating the concentrate and separating calcium salt and sodium chloride. The magnesium chloride content and a breakdown of the minor constituent content were as shown in Table 3 below.

TABLE 3

|  | Calcium salt |
|---|---|
| Mg (%) | 5.18 |
| Fe (ppm) | 0.34 |
| Cu (ppm) | 0.74 |
| Mn (ppm) | 0.25 |
| Zn | 1.48 |
| Co | 0.01 |
| Mo | 0.28 |

Taste Test Results

Using the above-mentioned raw ingredients, a taste test was conducted. The test results are shown in Table 4 below. The drink hardness and magnesium-to-calcium weight ratios used for the test are as follows:

Weight Ratio of Magnesium to Calcium

A=6 to 1, B=5 to 1, C=4 to 1, D=3 to 1, E=2 to 1, F=1 to 1, G=1 to 2, H=1 to 3, I=1 to 4 and J=1 to 5

Drink hardness (measured by the EDTA method) was set to the following values:

50, 100, 200, 500, 1000, 1500, 2000, 3000 and 4000

TABLE 4

| Hardness (EDTA method) | Magnesium-to-Calcium Weight Ratio | | | | | | | | | |
|---|---|---|---|---|---|---|---|---|---|---|
|  | A | B | C | D | E | F | G | H | I | J |
| 50 | ○ | ○ | □ | □ | □ | □ | □ | □ | ○ | ○ |
| 100 | △ | △ | ○ | □ | □ | □ | □ | ○ | △ | △ |
| 200 | △ | △ | ○ | □ | □ | □ | □ | ○ | △ | △ |
| 500 | △ | △ | ○ | □ | □ | □ | □ | ○ | △ | △ |
| 1,000 | △ | △ | ○ | □ | □ | □ | □ | ○ | △ | △ |
| 1,500 | X | △ | ○ | □ | □ | □ | □ | ○ | △ | △ |
| 2,000 | X | X | ○ | □ | □ | ○ | ○ | ○ | △ | △ |
| 3,000 | X | X | ○ | ○ | ○ | ○ | ○ | ○ | △ | — |
| 4,000 | X | X | X | X | X | X | X | X | — | — |

Note:
An evaluation method used is as follows:
Drinks were tested by the sense of taste of five monitors, adult men and women.
□: Most satisfactory, ○: Satisfactory, △: Slightly poor, X: Poor Evaluation of Test Results Drinks hardness with a below 100 were tasty. However, they contained a very small quantity of magnesium, calcium and minor minerals, which was not desirable from a standpoint of supplementing minerals. Drinks hardness with an above 100 and a magnesium-to-calcium weight ratio exceeding four had a bitter taste of magnesium, which was not desirable. Drinks hardness with an above 100 and a calcium-to-magnesium weight ratio exceeding three had a hard taste, which was not desirable.

When drink hardness was higher than 3,000 and a calcium-to-magnesium weight ratio exceeded four, calcium salt stopped dissolving, which was not desirable. When its hardness reached 4,000, a drink was not tasty, which was not desirable.

As a result, it was found that a drink was tasty when its hardness was from 100 to 3,000 and a magnesium-to-calcium weight ratio was 'four to one' to 'one to three'.

Using the above-mentioned raw ingredients, the results of the ICP-MS analysis of a drink prepared with a magnesium-to-calcium weight ratio of three to one and hardness of 1000 are as follows:

TABLE 5

| | Hardness 1000 |
|---|---|
| Na | 74 ppm |
| Mg | 200 ppm |
| Ca | 71 ppm |
| K | 69 ppm |
| Fe | 7.4 ppb |
| Zn | 34.5 ppb |
| Cu | 24.4 ppb |
| I | 8.8 ppb |
| P | 2.8 ppb |
| Se | 1.9 ppb |
| Mn | 0.1 ppb |

[Embodiment 2]

Processing of Seawater:

Seawater was separated into dilute water and concentrate using an ion-exchange electrodialysis device. An ion-exchange electrodialysis device manufactured by Asahi Glass Company was used. Operation conditions were as follows:

Operating condition: Effective membrane area: 1.72 cm2/sheet (14 sheets of cation-exchange membranes and 10 sheets of anion-exchange membranes were used.)

Constant current: 8 A

Flow speed: 200 L/H

Fluid temperature: 14° C. (57.2° F.)

Transmissibility of water separated by the above-mentioned operation was as shown in Table 6 below:

TABLE 6

| | Seawater | Dilute Water |
|---|---|---|
| Transmissibility ($\mu$S/cm) | 155,000 | 2,800 |

Calcium and Magnesium Content:

The concentrate was condensed and desalted, and was separated to sodium chloride and calcium and magnesium salt solution. The content of calcium and magnesium salt solution was as shown in Table 7 below.

(To add to the above, likewise the embodiment 1, minor minerals such as copper and manganese were also included.)

TABLE 7

| | Unit | Content |
|---|---|---|
| Ca | % | 0.74 |
| Mg | % | 2.80 |
| Fe | ppb | 14 |
| Cu | ppb | 15 |
| Mn | ppb | 0.16 |
| Zn | ppb | 742 |
| Mo | ppb | 180 |
| I | ppm | 1.3 |

Using the water with the transmissibility of 131 $\mu$S/cm obtained from the above-mentioned reverse osmosis membrane processing and the calcium and magnesium solution of Table 7, a taste test of drinks whose hardness was adjusted to 'a' to 'I' below was conducted. The test results are shown in Table 8 below. The drink hardness values used for the test are as follows:

a=50, b=100, c=200, d=500, e=1,000, f=1,500, g=2,000, h=3,000, I=4,000.

TABLE 8

| Hardness (EDTA method) | a | b | c | d | e | f | g | h | I |
|---|---|---|---|---|---|---|---|---|---|
| Test Result | □ | □ | □ | □ | □ | □ | ○ | ○ | X |

Note:
An evaluation method used is as follows:
Drinks were tested by the sense of taste of five monitors, adult men and women.
□: Most satisfactory, ○: Satisfactory, X: Poor Evaluation of Test Results When its hardness was below 100, a drink was tasty. However, it contained a very small quantity of magnesium, calcium and minor minerals, which was not desirable from a standpoint of supplementing minerals.

When its hardness was above 4,000, a drink was not tasty, which was not desirable.

As a result, it was found that a drink was tasty when its hardness was from 100 to 3,000 and a magnesium-to-calcium weight ratio was 'four to one' to 'one to three'. Using the above-mentioned raw ingredients, the results of the ICP-MS analysis of a drink prepared with a magnesium-to-calcium weight ratio of three to one and hardness of 250 are as follows:

TABLE 9

| | Hardness 250 |
|---|---|
| Na | 19 ppm |
| Mg | 50 ppm |
| Ca | 18 ppm |
| K | 17 ppm |
| Fe | 1.9 ppb |
| Zn | 8.6 ppb |
| Cu | 6.1 ppb |
| I | 2.2 ppb |
| P | 0.7 ppb |
| Se | 0.5 ppb |

[Embodiment 3]

Refreshing drinks with an ume (Japanese apricot) flavor were prepared using the same raw ingredients as used in the embodiment 1, and a taste test was conducted. The test results are shown below.

Drinks used for the test were adjusted to a magnesium-to-calcium weight ratio of three to one and hardness of 1,000.

TABLE 10

| Raw Ingredient | Mixture 1 | Mixture 2 | Mixture 3 |
|---|---|---|---|
| Ume (Japanese apricot) extract | 2 | 4 | 6 |
| Vitamin C | 0.05 | 0.05 | 0.05 |
| oligosaccharide | 5 | 5 | 5 |
| Evaluation | ○ | □ | Δ |

Note:
An evaluation method used is as follows:
Drinks were tested by the sense of taste of five monitors, adult men and women.
□: Most satisfactory, ○: Satisfactory, Δ: Slightly poor, X: Poor

[Embodiment 4]

By having rats freely take high-cholesterol feeds and a drink adjusted to hardness of 1,000 for four weeks, the total cholesterol level in rats' blood plasma and LDL-Ch were measured. Male Wister rats of 10 weeks (a group of eight) were used as test subjects. The results of the total cholesterol level and LDL-Ch are shown in Table 11 below.

TABLE 11

|  | Total Cholesterol Level | LDL-Ch |
|---|---|---|
| High cholesterol feeds | 144 | 38 |
| High cholesterol feeds + drink w/hardness of 1,000 | 101 | 26 |

Evaluation of Test Results

It was confirmed that an increase in total cholesterol and LDL-Ch which is considered to cause arteriosclerosis was suppressed by taking a drink rich in minerals and with hardness of 1,000.

INDUSTRIAL APPLICABILITY

As is obvious from the description above, a drink obtained using surface water or deep water according to the present invention can use essential minerals such as magnesium and calcium and essential minor minerals contained in seawater effectively and an amount of magnesium and calcium to be included can be changed optionally. Because sodium chloride is mostly removed, the drink does not have a salty taste and does not have a bad effect by sodium chloride on health. Additionally, because moderate flavoring of the drink is possible, drinks such as "healthy drinking water", "refreshing drinking water", or others, which are pleasant to drink and which sufficiently satisfy consumers, can be provided.

What is claimed is:

1. A method for producing a drink, comprising the steps of:
    collecting seawater;
    separating the seawater into water and a concentrate by desalting; and
    adding to said separated water water-soluble mineral components obtained from said concentrate or another seawater concentrate, wherein said mineral components are magnesium and calcium, said magnesium and calcium are added to adjust the weight ratio of magnesium to calcium (Mg/Ca) to 4/1 to 1/3, and said desalination is conducted to adjust a hardness of water to 100 to 3,000 as measured by the EDTA method.
2. The method for producing a drink as claimed in claim 1, wherein the seawater is deep water obtained at a depth greater than 100 m.
3. The method for producing a drink as claimed in claim 2, wherein the seawater is deep water obtained at a depth of 200 to 500 m.
4. A drink produced by the process of claim 3.
5. A drink produced by the process of claim 2.
6. The method for producing a drink as claimed in claim 1, wherein the weight ratio of magnesium to calcium (Mg/Ca) is adjusted to 3/1.
7. A drink produced by the process of claim 6.
8. The method for producing a drink as claimed in claim 1, wherein the hardness of water is adjusted to 250 or 1,000.
9. A drink produced by the process of claim 8.
10. The method for producing a drink as claimed in claim 1, wherein the seawater subjected to desalinization is surface water.
11. A drink produced by the process of claim 10.
12. A drink produced by the process of claim 1.
13. A drink produced by the process of claim 1, further comprising sugar or sour flavors for adjusting the taste.
14. A drink produced by the process of claim 1, wherein said seawater subjected to desalination is deep water.

* * * * *